United States Patent [19]
Hasegawa

[11] Patent Number: 5,828,521
[45] Date of Patent: Oct. 27, 1998

[54] ARM UNIT FOR HARD DISK DRIVE

[75] Inventor: Hitoshi Hasegawa, Saitama, Japan

[73] Assignees: Nittoku Engineering Kabushiki Kaisha; Nittoku Giken Kabushiki Kaisha, both of Saitama, Japan

[21] Appl. No.: 723,654

[22] Filed: Oct. 3, 1996

[30] Foreign Application Priority Data

Feb. 29, 1996 [JP] Japan .................................... 8-043066

[51] Int. Cl.⁶ .................................. G11B 5/48; G11B 5/55
[52] U.S. Cl. ........................................... 360/104; 360/106
[58] Field of Search .................................... 360/104, 105, 360/106

[56] References Cited

U.S. PATENT DOCUMENTS

| | | | |
|---|---|---|---|
| 4,991,045 | 2/1991 | Oberg | 360/104 |
| 5,187,626 | 2/1993 | Hopkins et al. | 360/104 |
| 5,461,524 | 10/1995 | Jurgenson | 360/104 |
| 5,621,590 | 4/1997 | Pace et al. | 360/104 |
| 5,644,453 | 7/1997 | Eckberg et al. | 360/106 |

FOREIGN PATENT DOCUMENTS

| | | | |
|---|---|---|---|
| 56-71859 | 6/1981 | Japan | 360/105 A |
| 58-111158 | 7/1983 | Japan | 360/104 |
| 60-140573 | 7/1985 | Japan | 360/105 |
| 2-161665 | 6/1990 | Japan | 360/106 |

*Primary Examiner*—Allen T. Cao
*Attorney, Agent, or Firm*—Jordan and Hamburg

[57] ABSTRACT

An arm unit for a hard disk drive is made by assembling together a plurality of stacked arms, a bearing member for supporting the arm unit upon a pivot shaft, and a coil for providing a magnetic force to swing the arm unit around the pivot shaft. Spacers are provided between the arms, and structural are provided for maintaining gaps between the arms and the spacers. Holes formed in the arms and in the spacers receive the bearing member while maintaining a predetermined gap. These assembled elements are then arranged within a mold and are fixed together into one unitary body by resin injected into the mold. By this construction, the assembly of the unit into the mold is facilitated, and the manufacturing cost of the arm unit is reduced.

6 Claims, 4 Drawing Sheets

ARM UNIT FOR HARD DISK DRIVE

BACKGROUND OF THE INVENTION

This invention relates to an arm unit of a magnetic actuator which is used in a hard disk drive.

In a hard disk drive, in order to drive magnetic heads which read information from and write information upon a disk, a swing type actuator is used which pivots around, for example, a shaft. The magnetic heads are fixed at the ends of arms which are supported by and pivot around the shaft, and the magnetic heads are shifted by the pivoting of the arms over the recorded tracks on the disk which is revolving, so that the information which is written on the disk can be read out or written. The magnetic disk consists of a plurality of stacked platters spaced apart at fixed intervals, and one magnetic head is supported at the end of each of the plurality of arms, which all pivot together as one. Thereby the heads are shifted over the platters while predetermined proper gaps are maintained between the heads and the platters.

The plurality of arms are stacked in the vertical direction, and constitute a single unitary arm unit. A cylindrical type bearing is inserted in this arm unit, and the above described shaft is engaged in the inside of this bearing so that the arm unit is supported by the shaft while remaining freely rotatable with respect thereto. In order to pivot the arms, a coil is fixed to a base end of the arm unit, and a magnet is disposed around this coil. The coil is magnetized by flowing current through it so that drive force acts according to Fleming's left-hand rule between the coil and the magnet, and the arms are thereby pivotally driven around the shaft according to the direction of the supplied current.

The plurality of arms in the arm unit may be made, for example, of metal and stacked over one another via spacers and fixed together so as to form an arm unit. However, if an extremely small gap is existing between an arm and a spacer, the arm unit may have a characteristic frequency of vibration which is different from the proper one. As a result, the phenomenon of resonance may occur at frequencies in the region of this characteristic frequency, and the operation of the actuator may become unstable. In order to eliminate any chance of occurrence of this type of gap, a high accuracy of manufacture is required.

Another method of forming the arm unit is to set the arms, the bearing and the coil in a mold and inject resin into the mold so as to unify all these elements into one body.

However, even in this case the resin has a tendency to shrink as it hardens and a gap may appear between the bearing and the resin surrounding it. This gap adversely affects the strength by which the bearing is fixed to the arm unit.

Further, if these arms, which are made of metal, are to be grounded via the shaft in order to discharge static electricity which might otherwise build up upon them, accurate dimensional control is required to securely contact the arms and the shaft together during manufacture using a mold as described above. If these requirements relating to accuracy are to be fulfilled, naturally the manufacturing cost of the arm is increased.

SUMMARY OF THE INVENTION

It is therefore an object of this invention to facilitate the manufacture of a disk drive arm by molding.

It is a further object of this invention to reduce the cost of manufacturing the arm.

In order to achieve the above objects, the invention provides an arm unit for a hard disk drive. The unit comprises a plurality of arms stacked over one another, a bearing member inserted through the base ends of the arms for supporting the arms so as to be rotatable on a pivot shaft which is inserted in the bearing member, a coil for generating a magnetic force for swinging the arms around the pivot shaft, a spacer provided between the arms, holes formed in the arms and in the spacers for receiving the bearing member while maintaining a gap which is later filled with resin, and a mechanism for maintaining gaps between the arms and the spacer which is later filled with resin.

It is preferable that the gap maintaining mechanism comprises a concave portion formed upon one of the mutually opposing faces of the arms and the spacer, and a projection, formed upon the other of the mutually opposing faces, which engages with the concave portion.

It is further preferable that one of the projections have a height greater than a depth of the concave portion which is engaged with this projection.

It is also preferable that one of the projections and one of the concave portions which are engaged together are formed to have such dimensions as to be tightly engaged together.

It is also preferable that the bearing member comprises a hollow cylindrical member which has an axially extending slot, and is capable of being widened out with a jig.

It is also preferable that the bearing member comprises a projection which, when the bearing member is inserted through the holes, bites into any one of the arms and the spacer.

The details as well as other features and advantages of the invention are set forth in the remainder of the specification and are shown in the accompanying drawings.

DESCRIPTION OF THE PREFERRED EMBODIMENT

Figure 1:
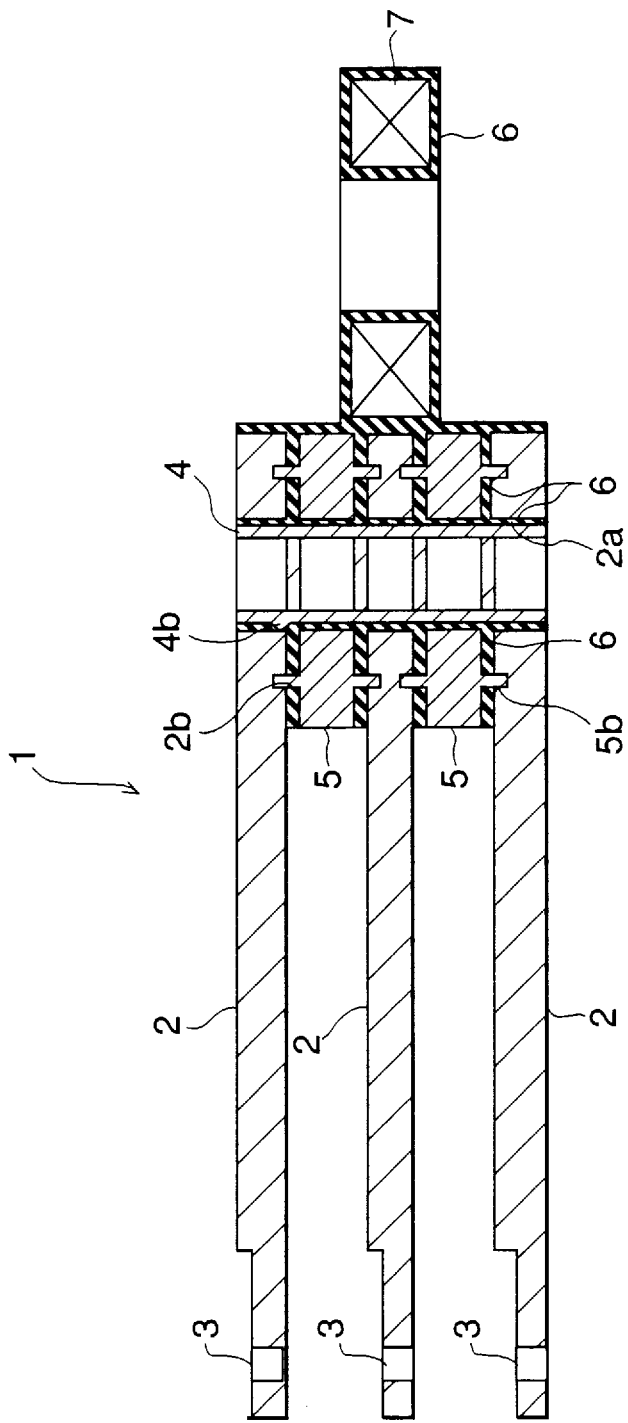
FIG. 1 is a vertical sectional view of an arm unit according to this invention.

Referring to FIG. 1 of the drawings, an arm unit 1, which is to be used in a device for reading and writing from and to a hard disk, comprises three arms 2 formed as metal plates which are thin in the vertical direction and which are stacked over one another with gaps of a predetermined size between them. The arm unit 1 is not to be considered as necessarily being composed of three arms; in other embodiments, the number of arms might be varied according to the number of platters of the revolving hard disk unit (not shown) with which the arm unit 1 was required to cooperate. The number of platters provided to such a hard disk typically varies according to the storage capacity which is required.

Fixing holes 3 are provided in the end of the arms 2 for fixing magnetic heads (not shown) thereto.

The arms 2 may be produced, for example, from metal such as aluminum or the like by a pressing process, or by coining (a cold forging process), or by molding. The thickness of each arm 2 is reduced at its end in the vicinity of the hole 3 by coining. The arms 2 are stacked over one another at predetermined intervals, and spacers 5 are provided between neighboring ones of the arms 2.

These spacers 5 may be stamped from metal such as aluminum or the like by coining, or may also be made by a process of extrusion.

Figure 3:
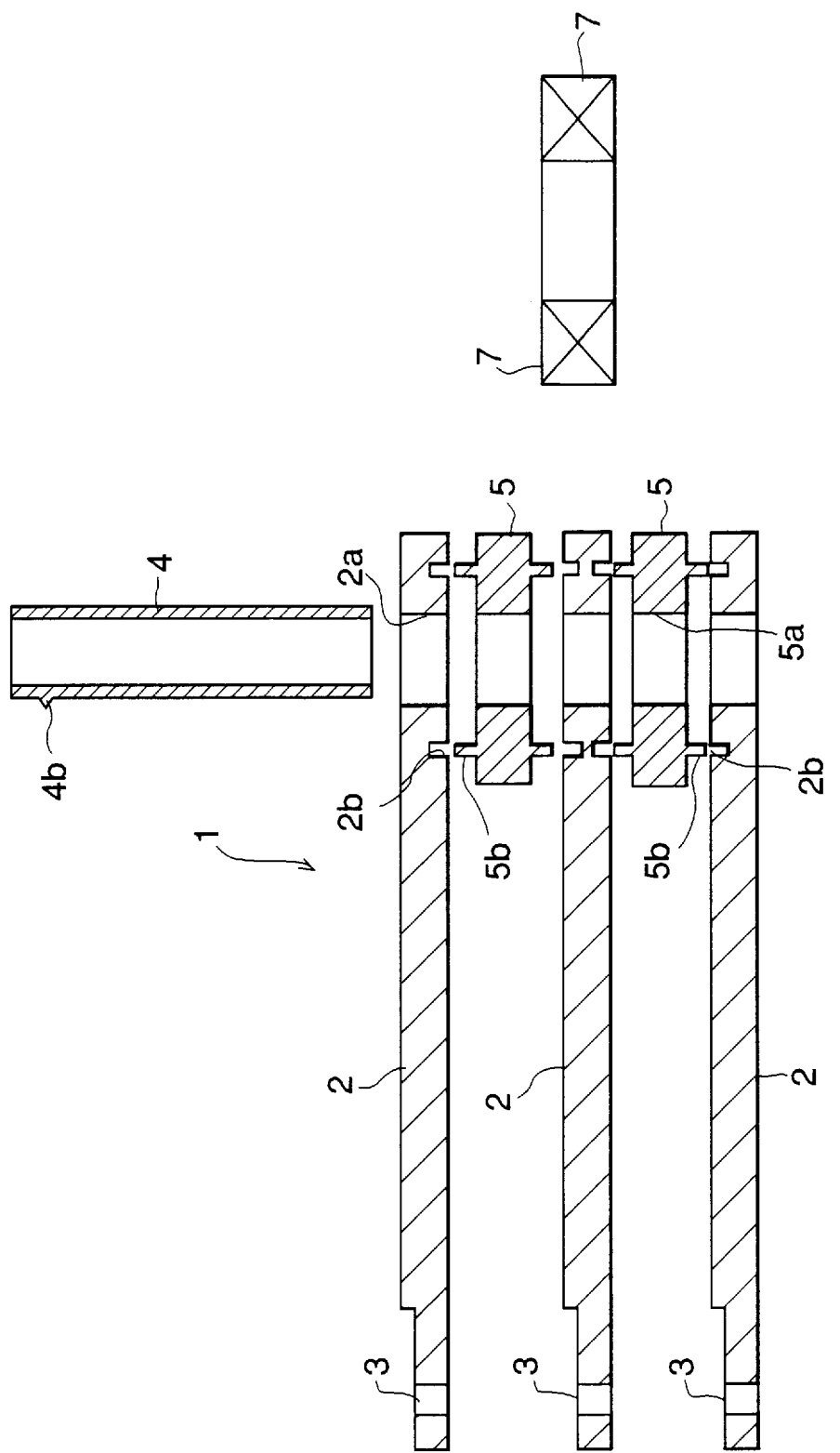
FIG. 3 is a vertical sectional view of the arm unit in the exploded state.
Figure 4:
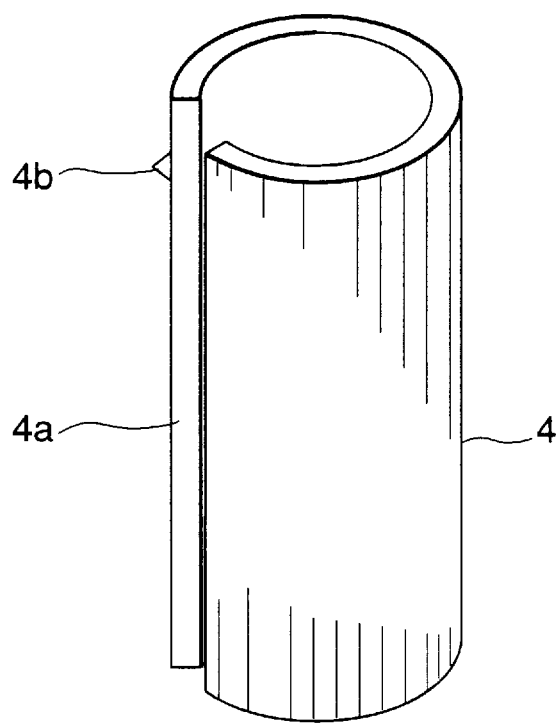
FIG. 4 is a perspective view of a bearing member of C-shaped section which is used in the arm unit.

A round fitting hole 2a is formed in the base end of each of the arms 2 and a similar round fitting hole 5a is formed in each of the spacers 5 as shown in FIG. 3. The swing arms 2 and the spacers 5 are stacked together with their fitting holes 2a and 5a all coinciding, and a cylindrical bearing member 4 made from metal shown in FIG. 4 is inserted into the superposed fitting holes 2a and 5a. A supporting pivot shaft (not shown in the figures) is insertable into the bearing member 4 to support it, and thereby the arm unit 1 is pivotally supported to be freely swung to and fro.

This bearing member 4 is of generally hollow cylindrical form, as shown FIG. 4, with a thin longitudinal slot 4a extending along it in the axial direction, and may be formed by curling (rolling up) a metal plate. A pointed projection 4b is formed upon the side surface of the bearing member 4 which is arranged to bite into an inner surface of the fitting hole 2a of the uppermost one of the arms 2.

The bearing member 4, which is inserted into the fitting holes 2a of the arms 2 and the holes 5a of the spacers 5, is widened out using a jig to a predetermined diameter. A predetermined gap is left between the bearing member 4 in its widened out state and the inner circumferential surfaces of the holes 2a and 5a. On the other hand, the projection 4b bites into the material of the uppermost one of the arms 2, and thereby the electrical connection between this arm 2 and the bearing member 4 is assured. Static electricity which accumulates upon the arms 2, which are made of aluminum, is grounded to the frame of the magnetic disk device via the projection 4b, the bearing member 4, and the support shaft not shown in the figure. It would also be acceptable to provide other such projections 4b in positions corresponding to the other arms 2 and to the spacers 5.

The surfaces of the arms 2 which face the spacers 5 are formed with a plurality of concave portions 2b which surround the fitting holes 2a. Projections 5b, which engage with the concave portions 2b, are formed upon the spacers 5. The projections 5b have a height which is a predetermined amount greater than a depth of the corresponding concave portions 2b. Thus, slight gaps are ensured between the arms 2 and the spacers 5 when the arms 2 and the spacers 5 are stacked upon one another. This is done so that the resin can infiltrate into these gaps and plug them up during molding process, and thereby, in the finished article, no gaps remain between the arms 2 and the spacers 5.

Further, the concave portions 2b and the projections 5b have dimensions so as to be tightly engaged together. As a result, the arm unit 1 is held together by with the concave portions 2b and the projections 5b engaging one another in a state almost close to the state in which it is fitted into the mold. The height of the projections 5b need not necessarily be greater than the depth of the concave portions 2b, because the width of the gaps between the arms 2 and the spacers 5 is easily adjusted by adjusting the length of a portion of the projections 5b engaging the concave portions 2b. Due to the tight engagement of the projections 5b and the concave portions 2b, the gaps are maintained unless otherwise they are adjusted again.

In this manner the arm unit 1 is assembled in advance into a form close to complete assembly, before being fitted into the mold.

A member is provided in the mold for precisely determining the position of the elements, and this position determination member further reliably controls the gaps between the arms 2 and the spacers 5. However, the disposition of the arms 2 and the spacers 5 is in a state almost approaching the state when the arm unit 1 is completed since the predetermined gaps between the arms 2 and the spacers 5 are roughly defined in advance by the engagement of the projections 5b into the concave portions 2b, and thereby the fitting of the arms 2 and the spacers 5 into the mold is easily accomplished.

Moreover, it is not necessary for the gaps, which are defined by the engagement of the projections 5b into the concave portions 2b, to be absolutely accurately the same as the gaps between the arms 2 and the spacers 5 when the arm unit 1 is in the completed state. It would be acceptable for these gaps to be set somewhat smaller than in the final arm unit, or the gaps may even be substantially eliminated such that the projections 5b and the concave portions 2b only fulfill the function of providing fixed relative positioning of the arms 2 and the spacers 5 in the horizontal direction so as to prevent mutual deviation between them. In this case, the position determination member fitted to the mold should widen out or provide the gaps when the assembly is arranged in the mold, so that during the molding process the resin (denoted by 6) flows into the gaps and sets the dimensions accurately.

Further, the projection 4b which is provided upon the above described bearing member 4 is also formable in a position corresponding to any one of the spacers 5, and in such a case the projection 4b bites into the chosen spacer 5, and the electrical connection of the arms 2 and the bearing member 4 is assured via the chosen spacer 5.

Figure 2:
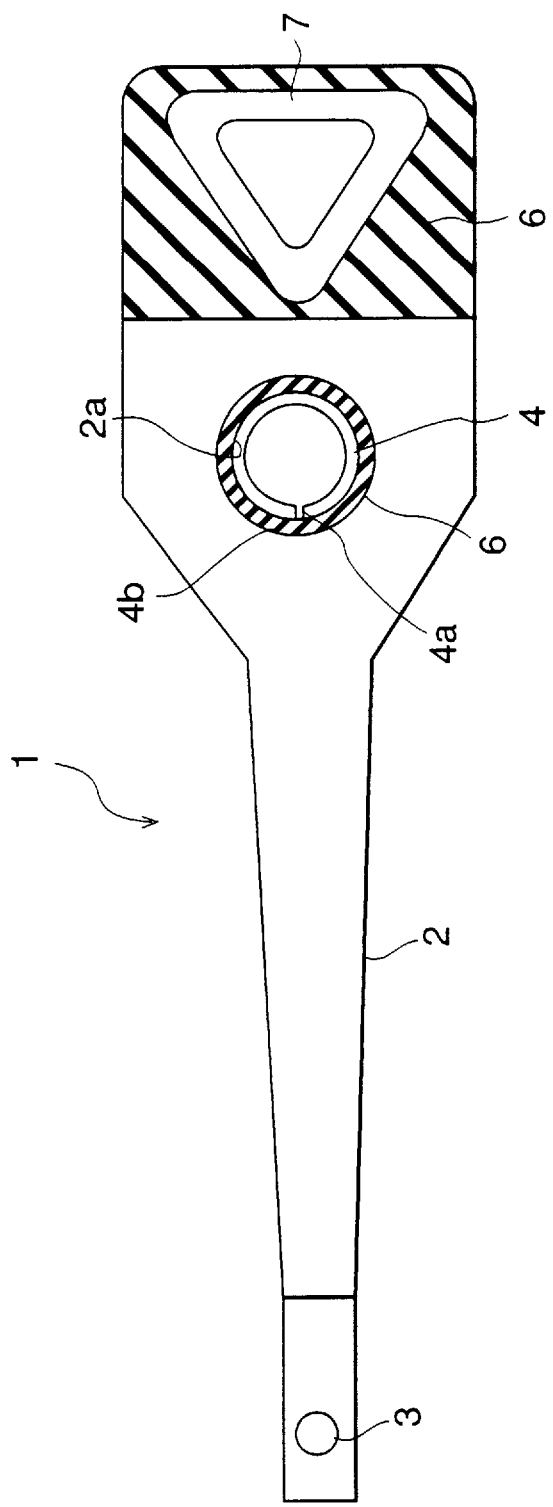
FIG. 2 is a plan view of the arm unit.

Moreover, a coil 7 of generally triangular form, as shown in FIG. 2, is arranged at a base end of the arm unit 1 such that its gaps is in parallel with the bearing member 4, and is form ed into one unit with the arms 2 by molding with the resin 6.

After the bearing member 4 is inserted into the holes 2a of the arms 2 and the holes 5a of the spacers 5, it is widened out by a jig which opens the slot 4a so that the internal diameter of this bearing member 4 is increased to a certain value suitable for insertion of a pivot shaft, not shown in the drawings, for the arm unit 1, and so that small gaps remain between the member 4 and the arm 2/spacers 5. In the same way as the resin 6 which is injected into the gaps between the arms 2 and the spacers 5, the resin is injected into the gap between the arms 2 (the spacers 5) and the bearing member 4 and is thin enough so as not to be subject to shrinkage. Accordingly these structural elements are perfectly unified, so that the C shaped bearing member 4 comes to be fixed with sufficient strength with respect to the arms 2 and the spacers 5. Accordingly, there is no danger of the occurrence of unexpected resonance caused as a result of the existence of gaps between the various structural elements and the resin 6, and the operation of the finished arm unit 1 is stable. Due to this, the members of the arm unit 1 are not required to have particularly high dimensional accuracy, and it is not necessary for the contacting faces of the arms 2 and the spacers 5 to be subjected to any additional processing.

Further, not only does the projection 4b of the bearing member 4 guarantee perfect electrical contact between the arm 2, into which it bites, and the bearing member 4, but the projection 4b also serves for grounding all of the arms 2, since the arms 2 are all electrically connected together via the spacers. Thus, grounding is ensured even though no special grounding member is provided. Further, especially high dimensional accuracy is not required for the bearing member 4 in order to achieve this. Thus, according to this invention, a good quality arm unit 1 may be manufactured at a low cost.

The embodiments of this invention in which an exclusive property or privilege is claimed are defined as follows:

1. A pivot arm unit which is pivotable on a pivot shaft in a hard disk drive, the pivot arm unit comprising:

arm members having base ends and distal ends, said base ends defining apertures and said arm members being stacked over one another;

a bearing member inserted through said apertures of the base ends of said arm member for rotatably supporting said arm members on said pivot shaft of said hard disk drive;

a coil for generating a magnetic force for swinging said arm members about said pivot shaft, said coil being disposed adjacent said base end;

a spacer disposed between said arm members, said spacer defining an aperture through which said bearing member extends;

said apertures of said arm members and said aperture of said spacer having a diameter such that an annular gap exists between said bearing member and inner surfaces of said apertures of said arm members and of said aperture of said spacer;

means for maintaining gaps between said arm members and said spacer; and molded resin filling said annular gap and said gaps to join said arm members, said spacer and said bearing member together and said molded resin connecting said coil with said base ends.

2. The pivot arm unit as defined in claim 1, wherein said maintaining means comprises concave portions formed upon one of mutually opposing faces of said arm members and said spacer, and projections formed upon another one of said mutually opposing faces, and said concave portions engage opposing ones of said projections.

3. The pivot arm unit as defined in claim 2, wherein said projections have a height greater than a depth of the concave portions.

4. The pivot arm unit as defined in claim 2, wherein said projections and said concave portions are dimensioned to be tightly engaged together.

5. The pivot arm unit as defined in claim 1, wherein said bearing member comprises a hollow cylindrical member which has an axially extending slot, and is capable of being expanded with a jig.

6. The pivot arm unit as defined in claim 1, wherein said bearing member includes a projection which, when said bearing member is inserted through said holes, bites into any one of said arm members and said spacer.

* * * * *